Patented Jan. 13, 1948

2,434,564

UNITED STATES PATENT OFFICE 2,434,564

SUBSTITUTED NITRO AROMATIC AMINES AS INSECTICIDES

William F. Hester, Drexel Hill, and W E Craig, Philadelphia, Pa., assignors to Röhm & Haas Company, Philadelphia, Pa., a corporation of Delaware No Drawing. Application June 8, 1943, Serial No. 490,046

9 Claims. (Cl. 167—30)

This invention relates to insecticidal compositions having as an active principle a compound of the formula:

$$(NO_2)_n\text{—}ArNHCH_2CH_2Z$$

wherein Ar is an aryl nucleus of the benzene or naphthalene series, Z is a member of the class consisting of —OH, —OR, and —OCOR, and $n$ is an integer having a value from one to two, inclusive, R representing a hydrocarbon group from the aliphatic, aromatic, or alicyclic series, such as methyl, ethyl, allyl, propyl, isopropyl, butyl, methallyl, octyl, undecenyl, dodecyl, octadecenyl, octadecyl, benzyl, phenyl, methyl phenyl, naphthyl, naphthenyl, abietyl, etc.

Compounds of the above type may be prepared by various known procedures, such as the reaction of a nitrochlorobenzene or nitrobromonaphthalene with ethanolamine in the presence of an alkali, and conversion of the resulting ethanolic compound to an ether or ester. In some cases, a nitroaniline may be reacted with an ether halide or ester of a halohydrin, such as phenoxyethyl chloride, ethoxyethyl chloride, or the acetate of chlorohydrin to yield compounds of the formula:

$$(NO_2)_n\text{—}ArNH\text{—}CH_2CH_2OR$$

and $$(NO_2)_n\text{—}ArNH\text{—}CH_2CH_2O\overset{O}{\overset{\|}{C}}\text{—}R$$

There may also be reacted an ether halide, a halohydrin, or an ester of a halohydrin with an aryl amine and the resulting product nitrated. Similarly, mononitro compounds may be converted to polynitro compounds. By such methods, there are obtained compounds wherein the ester group of the above formula may be an acetate, propionate, butyrate, benzoate, naphthenate, or other ester group resulting by substitution of one of the above values of R.

To illustrate the preparation of typical compounds, the following examples are given:

Example 1

A mixture of 157.5 parts of o-nitrochlorobenzene, 61 parts of ethanolamine, and 212 parts of soda ash was stirred and heated under reflux for eight hours and thereafter steam-distilled, leaving a tarry residue, which was taken up in hot benzene. On cooling, 90 parts of crystals were obtained, having a melting point of 73°–74° C. and corresponding to the formula:

$$2\text{—}NO_2C_6H_4NHCH_2CH_2OH$$

Example 2

A mixture of 200 parts of 2,4-dinitrochlorobenzene, 980 parts of 95% ethanol, 60 parts of ethanolamine, 60 parts of water, and 40 parts of sodium hydroxide was stirred and heated under reflux for one hour, whereupon the mixture was cooled, filtered, and concentrated. The product, recrystallized from alcohol, melts at 87°–88° C. and has the composition:

$$2,4\text{—}(NO_2)_2C_6H_3NHCH_2CH_2OH$$

It has been found that compounds of the general formula above may be applied as the active agents in insecticides against a wide variety of insects. They may be applied in the form of solutions in organic solvents, in the form of aqueous emulsions, in the form of dusts, or in the form of sprays in which the compounds are carried on a finely divided solid. The insecticidal compositions thus comprise one of the above-defined compounds and a suitable carrier therefor. The form of the preparation to be used will depend primarily upon the type of insect to be combatted. Against soft-bodied insects, for instance, it is usually desirable to dissolve the insecticidal agent in an organic solvent and apply it in this form or in the form of an emulsion by adding a suitable emulsifying agent, such as a sulfonated oil.

A useful spray of the latter type may be prepared by dissolving one part of the toxicant with one part of emulsifying agent in two parts of pine oil and extending this preparation with 100 to 400 parts of water. This gives an effective concentration of toxicant of one part in 400 to one part in 1600.

Typical results from spraying nasturtiums infested with aphids are given below. The toxicant was used at a concentration of 1 to 1600, the minimum concentration recommended. The counts were made twenty-four hours after spraying:

| Compound | Percent Kill |
|---|---|
| 2,4—(NO₂)₂C₆H₃NHCH₂CH₂OH | 40 |
| 2—NO₂C₆H₄NHCH₂CH₂OH | 33 |
| 2,4—(NO₂)₂C₆H₃NHCH₂CH₂OC₆H₅ | 58 |

A similar spray, containing $$2\text{—}NO_2C_6H_4NHCH_2CH_2OH$$

at 1 to 1200, was applied to coleus plants infested with mealy bugs. The kill after twenty-four hours was 61%. Higher concentrations give greater kills without appreciable foliage injury.

Various compounds were spread on finely divided solids by dissolving the compounds in inert solvents, mixing the solution with the solid, and evaporating the solvent while the mixture was stirred. The compounds may also be spread on solids by mixing the toxicant with a solid or fusing a toxicant with an inert solid and grinding the mixture. A spray containing one part of active agent, two parts of magnesium carbonate, one-half part of a condensed sulfonated alkyl phenoxyethanol sulfate as a spreader, and 96.5 parts of water was applied to bean plants. Twenty-four hours later Mexican bean beetle larvae were applied to the plants, and, after a second twenty-four hours, observation was made of the effect of the toxicant on the larvae, counts being made of the insects which had fallen from the plant, dead or no longer capable of feeding on it. Results were as follows:

| Compound | Control |
|---|---|
| 2,4—$(NO_2)_2C_6H_3NHCH_2CH_2OH$ | 76 |
| 2—$NO_2C_6H_4NHCH_2CH_2OH$ | 66 |

Similar results were obtained by applying the toxicants in dusts, which were also prepared by spreading the active agent at concentrations of ½% to 10% on a finely divided solid. Typical formulae for dusts are:

| | Parts |
|---|---|
| A. Toxicant | 1 |
| Talc | 98 |
| Spreader | 1 |
| B. Toxicant | 1 |
| Alum sludge | 48 |
| Lime | 48 |
| Soya bean oil | 3 |

The control obtained with $$2,4\text{—}(NO_2)_2C_6H_3NHCH_2CH_2OH$$

at 0.33% in a formula of the above type used against bean beetle larvae was 90%.

In the foregoing examples the various ethanol derivatives of the nitroanilines have been shown as the sole toxic ingredient in insecticidal compositions. They may, however, also be used in conjunction with other insecticidal principles and fungicidal agents to give a single improved effect or to give a plurality of effects. Typical additional agents which may be used include rotenone, pyrethrins, nicotine, organic thiocyanates, other nitro aryl derivatives, arsenates, copper compounds, oils from petroleum, tar, animal, and vegetable origin, etc.

This application is a continuation-in-part of application Serial No. 367,569, filed November 28, 1940, now United States Patent No. 2,338,380, issued January 4, 1944.

We claim:

1. An insecticidal composition containing as an active principle a compound of the formula:

$$(NO_2)_n\text{—}ArNHCH_2CH_2Z$$

wherein Ar is an aryl nucleus selected from a member of the benzene and naphthalene series, Z is a member of the class consisting of —OH, —OR, and —OCOR groups, and n is an integer having a value from one to two, inclusive, R being a hydrocarbon group selected from the aliphatic, aromatic, and alicyclic series, and a carrier therefor selected from the class consisting of inert finely divided solids and organic solvents.

2. An insecticidal composition containing as an active principle a compound of the formula:

$$(NO_2)_2\text{—}phenyl\text{—}NHCH_2CH_2Z$$

wherein Z is a member of the class consisting of —OH, —OR, and —OCOR groups, R being a hydrocarbon group selected from the aliphatic, aromatic, and alicyclic series, and a carrier therefor selected from the class consisting of inert finely divided solids and organic solvents.

3. An insecticidal composition comprising as an active principle a compound of the formula:

$$NO_2\text{—}phenyl\text{—}NHCH_2CH_2Z$$

wherein Z is a member of the class consisting of —OH, —OR, and —OCOR groups, R being a hydrocarbon group selected from the aliphatic, aromatic, and alicyclic series, and a carrier therefor selected from the class consisting of inert finely divided solids and organic solvents.

4. An insecticidal composition comprising as an active principle a compound of the formula:

$$(NO_2)_n\text{—}phenyl\text{—}NHCH_2CH_2OH$$

wherein n is an integer from one to two, inclusive, and a carrier therefor selected from the class consisting of inert finely divided solids and organic solvents.

5. An insecticidal composition comprising as an active principle a compound of the formula:

$$(NO_2)\text{—}phenyl\text{—}NHCH_2CH_2OH$$

and a carrier therefor selected from the class consisting of inert finely divided solids and organic solvents.

6. An insecticidal composition comprising as an active principle a compound of the formula:

$$(NO_2)_2\text{—}phenyl\text{—}NHCH_2CH_2OH$$

and a carrier therefor selected from the class consisting of inert finely divided solids and organic solvents.

7. A process of controlling soft-bodied insects on living plants which comprises spraying plants infested with said insects with an aqueous emulsion containing in dispersed form a compound of the formula:

$$(NO_2)_n\text{—}ArNHCH_2CH_2Z$$

wherein Ar is an aryl nucleus selected from a member of the benzene and naphthalene series, n is an integer having a value from one to two, inclusive, and Z is a member of the class consisting of —OH, —OR, and —OCOR, wherein R is a hydrocarbon group selected from the aliphatic, aromatic, and alicyclic series.

8. A process of controlling soft-bodied insects on living plants which comprises spraying plants infested with said insects with an aqueous emulsion containing in dispersed form a compound of the formula:

$$(NO_2)_2C_6H_3NHCH_2CH_2OH$$

9. A process of controlling soft-bodied insects on living plants which comprises spraying plants infested with said insects with an aqueous emulsion containing in dispersed form a compound of the formula:

$$NO_2C_6H_4NHCH_2CH_2OH$$

WILLIAM F. HESTER.
W E CRAIG.

REFERENCES CITED

The following references are of record in the file of this patent:

UNITED STATES PATENTS

| Number | Name | Date |
|---|---|---|
| 2,202,902 | Ellis | June 4, 1940 |
| 2,019,626 | Olpin et al. | Nov. 5, 1935 |